United States Patent
Modave et al.

(10) Patent No.: US 9,870,489 B2
(45) Date of Patent: Jan. 16, 2018

(54) DETECTION OF THE AUTHENTICITY OF AN ELECTRONIC CIRCUIT OR OF A PRODUCT CONTAINING SUCH A CIRCUIT

(71) Applicants: Proton World International N.V., Zaventem (BE); STMicroelectronics (Rousset) SAS, Rousset (FR)

(72) Inventors: Jean-Louis Modave, Ottignies (BE); Fabrice Marinet, Chateauneuf le Rouge (FR); Denis Farison, Le Tholonet (FR)

(73) Assignees: STMICROELECTRONICS (ROUSSET) SAS, Rousset (FR); PROTON WORLD INTERNATIONAL N.V., Diegem (BE)

( * ) Notice: Subject to any disclaimer, the term of this patent is extended or adjusted under 35 U.S.C. 154(b) by 153 days.

(21) Appl. No.: 14/970,161

(22) Filed: Dec. 15, 2015

(65) Prior Publication Data
US 2017/0004333 A1    Jan. 5, 2017

(30) Foreign Application Priority Data
Jun. 30, 2015 (FR) ...................... 15 56125

(51) Int. Cl.
| G06F 21/00 | (2013.01) |
| G06F 21/85 | (2013.01) |
| G06F 21/73 | (2013.01) |
| G06F 21/81 | (2013.01) |
| G11C 27/00 | (2006.01) |

(52) U.S. Cl.
CPC .............. G06F 21/85 (2013.01); G06F 21/73 (2013.01); G06F 21/81 (2013.01); G11C 27/00 (2013.01)

(58) Field of Classification Search
USPC .......................................... 726/34
See application file for complete search history.

(56) References Cited

U.S. PATENT DOCUMENTS

| 8,036,020 | B2 | 10/2011 | La Rosa |
| 8,320,176 | B2 | 11/2012 | La Rosa |
| 8,331,203 | B2 | 12/2012 | La Rosa |
| 8,339,848 | B2 | 12/2012 | La Rosa |
| 8,872,177 | B2 | 10/2014 | La Rosa et al. |
| 8,963,574 | B2 | 2/2015 | La Rosa |
| 2006/0143454 | A1* | 6/2006 | Walmsley ............... G06F 21/85 713/170 |
| 2008/0309396 | A1* | 12/2008 | Lee ........................ G06F 21/73 327/509 |

(Continued)

OTHER PUBLICATIONS

Weiner et al., "A Low Area Probing Detector for Power Efficient Security ICs," in Saxena et al. (eds.), *International Workshop on Radio Frequency Identification: Security and Privacy Issues*, Springer International Publishing, Cham, Switzerland, 2014, pp. 185-197. (14 pages).

*Primary Examiner* — Jason Lee
(74) *Attorney, Agent, or Firm* — Seed IP Law Group LLP

(57) ABSTRACT

A method of authenticating a slave device. The method includes initializing, by a host device, a charge retention circuit of the slave device, and receiving, by the host device, an indication of a discharge time of the charge retention circuit. The host device authenticates the slave device based on the received indication of the discharge time of the charge retention device.

19 Claims, 4 Drawing Sheets

(56) References Cited

U.S. PATENT DOCUMENTS

| | | | | |
|---|---|---|---|---|
| 2011/0038481 A1* | 2/2011 | Modave | ............... | G06Q 20/02 |
| | | | | 380/277 |
| 2013/0088263 A1* | 4/2013 | La Rosa | ............ | G11C 27/024 |
| | | | | 327/80 |
| 2013/0133031 A1* | 5/2013 | Fainstein | ............... | G06F 21/44 |
| | | | | 726/2 |

* cited by examiner

DETECTION OF THE AUTHENTICITY OF AN ELECTRONIC CIRCUIT OR OF A PRODUCT CONTAINING SUCH A CIRCUIT

BACKGROUND

Technical Field

The present disclosure generally relates to electronic circuits and, more specifically, to a method for verifying the authenticity or the origin of a product (an accessory or a consumable) intended to cooperate with a device.

Description of the Related Art

In many fields, it is desired to guarantee that a product, for example, an ink cartridge, a battery, an accessory, etc., to be used in a device, is an original or authentic product, that is, a product approved by the device manufacturer. To achieve this, an authentication key is generally stored in an electronic circuit associated with this product and is used, when the product is installed in the device or when it should cooperate therewith, to verify that the product is authentic. However, if the secret can be pierced and a manufacturer commercializes products which are not approved by the device manufacturer, however equipped with circuits having the right key, the devices will consider these products as being authentic.

BRIEF SUMMARY

In an embodiment, a method comprises: initializing, by a host device, a charge retention circuit of a slave device; receiving, by the host device, an indication of a discharge time of the charge retention circuit; determining, by the host device, an authenticity of the slave device based on the received indication of the discharge time of the charge retention device; and controlling, by the host device, interactions with the slave device based on the determined authenticity of the slave device. In an embodiment, the host device compares information representative of time, generated by the charge retention circuit, with information indicative of an expected duration. In an embodiment, initializing the charge retention circuit comprises switching off a power supply of the slave device. In an embodiment, a duration of time in which the power supply of the slave device is switched off is random. In an embodiment, the method comprises: transmitting, by the host device to the slave device, a voltage representative of a charge level to be stored in the charge retention circuit; charging, by the slave device, of the charge retention circuit; switching off, by the host device, of a power supply of the slave device for a duration of time; measuring, by the slave device, a residual quantity of charges in the charge retention circuit at an expiration of the duration of time; transmitting, by the slave device to the host device, information representative of the residual quantity; and comparing, by the host device, said information with an expected value of said information. In an embodiment, the method comprises: receiving, by the slave device, a value indicating to the slave device a no-response time-period; charging, by the slave device, of the charge retention circuit; initializing of a time counter and switching off, by the host device, of a power supply of the slave device; switching on the power supply and periodically interrogating, by host device, of the slave device until the slave device responds to an interrogation; determining, by the host device, an elapsed duration based on when the slave device responded to the interrogation; and comparing the determined elapsed duration with an expected duration. In an embodiment, the method comprises transmitting, by the host device to the slave device, said value indicating the no-response time period. In an embodiment, the method comprises: transmitting, by a third device to the host device and the slave device, said value indicating the no-response time period.

In an embodiment, a device comprises: one or more memories; a slave-device interface; and circuitry, which, in operation: initializes charge-retention circuits via the slave-device interface; authenticates slave devices based on indications of discharge times of charge-retention circuits received via the slave-device interface; and controls interactions with slave devices based on slave-device authentications. In an embodiment, wherein the circuitry, in operation, compares an indication of a discharge time with information indicative of an expected duration. In an embodiment, the circuitry, in operation, initializes a charge-retention circuit by switching off a power supply associated with the charge-retention circuit. In an embodiment, a duration of time in which the power supply associated with the charge-retention circuit is switched off is random. In an embodiment, the circuitry, in operation: transmits, via the slave-device interface, a voltage representative of a charge level to be stored in a charge-retention circuit; switches off a power supply associated with the charge-retention circuit for a duration of time; and responds to receipt of an indication of a residual quantity of charges associated with the charge-retention circuit at an expiration of the duration of time by comparing said indication with an expected value. In an embodiment, the circuitry, in operation: initializes a time counter and switches off a power supply associated with a charge-retention circuit; switches on the power supply and periodically interrogates a slave device until the slave device responds to an interrogation; determines an elapsed duration based on when the slave device responds to the interrogation; and compares the determined elapsed duration with an expected duration. In an embodiment, the circuitry, in operation, transmits via the slave-device interface, a value indicating a no-response time period. In an embodiment, the circuitry, in operation, receives the value indicating the no-response period from a third device.

In an embodiment, a device comprises: a charge-retention circuit; an interface to couple to a host device; circuitry, which, in operation, responds to an initialization signal, by: initializing the charge-retention circuit; generating an indication of a discharge time of the charge-retention circuit; controlling communication with the host device based on the determined indication. In an embodiment, the controlling communication with the host device comprises transmitting the indication to the host device via the interface. In an embodiment, the initializing signal comprises a switching off of a power supply associated with the charge-retention circuit. In an embodiment, the initialization signal comprises a voltage representative of a charge level to be stored in the charge-retention circuit, and the circuitry, in operation: charges the charge retention circuit; measures a residual quantity of charges in the charge-retention circuit at an expiration of a duration of time; and transmits, to the host device via the interface, information representative of the residual quantity to be compared with an expected value. In an embodiment, the initialization signal comprises a value indicative of a no-response time-period, and the circuitry, in operation, responds to the initialization signal by: charging the charge-retention circuit; ignoring interrogations received via the interface until a charge-level of the charge-retention circuit corresponds to an expiration of the no-response time-period.

In an embodiment, a system comprises: a host device having control circuitry; and a slave device having a charge-retention circuit, wherein the control circuitry of the host device, in operation: controls one or more signals to cause the slave device to initialize the charge-retention circuit; receives an indication of a discharge time of the charge-retention circuit; determines an authenticity of the slave device based on the received indication of the discharge time of the charge-retention device; and controls interactions with the slave device based on the determined authenticity of the slave device. In an embodiment, the host device is a printer and the slave device is a printer cartridge. In an embodiment, the control circuitry, in operation, compares the indication of the discharge time with information indicative of an expected duration. In an embodiment, the control circuitry, in operation: transmits to the slave device, a voltage representative of a charge level to be stored in the charge-retention circuit; switches off a power supply associated with the charge-retention circuit for a duration of time; and responds to receipt of an indication of a residual quantity of charges associated with the charge-retention circuit at an expiration of the duration of time by comparing said indication with an expected value. In an embodiment, the control circuitry, in operation: initializes a time counter and switches off a power supply associated with the charge-retention circuit; switches on the power supply and periodically interrogates the slave device until the slave device responds to an interrogation; determines an elapsed duration based on when the slave device responds to the interrogation; and compares the determined elapsed duration with an expected duration.

An embodiment provides a solution particularly adapted to circuits which are not permanently powered.

An embodiment provides a method of verifying the authenticity of a product associated with a host device, wherein: a first electronic circuit of the device initializes a charge retention circuit of a second electronic circuit of the product; and the first circuit interprets a discharge duration of the charge retention circuit to decide whether the product is authentic or not.

According to an embodiment, the first circuit compares information representative of time, delivered by the charge retention circuit, with an expected duration.

According to an embodiment, the first circuit starts assessing the authenticity by switching off the power supply of the second circuit.

According to an embodiment, the duration for which the power supply of the second circuit is stopped is random.

According to an embodiment: the first circuit communicates to the second circuit a voltage representative of a charge level to be stored in the charge retention circuit; the second circuit charges the charge retention circuit; the first circuit switches off the power supply of the second circuit for a certain duration at the end of which the second circuit measures the residual quantity of charges in the charge retention circuit; the second circuit communicates information representative of this residual quantity to the first circuit; and the first circuit compares this information with an expected value.

According to an embodiment: the second circuit receives a time value during which the second circuit should refrain from responding to the first circuit; the second circuit charges the charge retention circuit; the first circuit switches off the power supply of the second circuit and initializes a time counter; the first circuit switches back on the second circuit and periodically interrogates it until it responds; and as soon as the second circuit responds, the first circuit compares the elapsed duration with an expected duration, which is a function of the characteristics of the charge retention circuit of the second circuit.

According to an embodiment, said time value is communicated to the second circuit by the first circuit.

According to an embodiment, said time value is communicated to the first circuit and to the second circuit by a third circuit.

An embodiment also provides a system comprising at least one host device and at least one product associated with this host device, adapted to the described method.

According to an embodiment, the device is a printer and the product is an ink cartridge.

DETAILED DESCRIPTION

Figure 1:
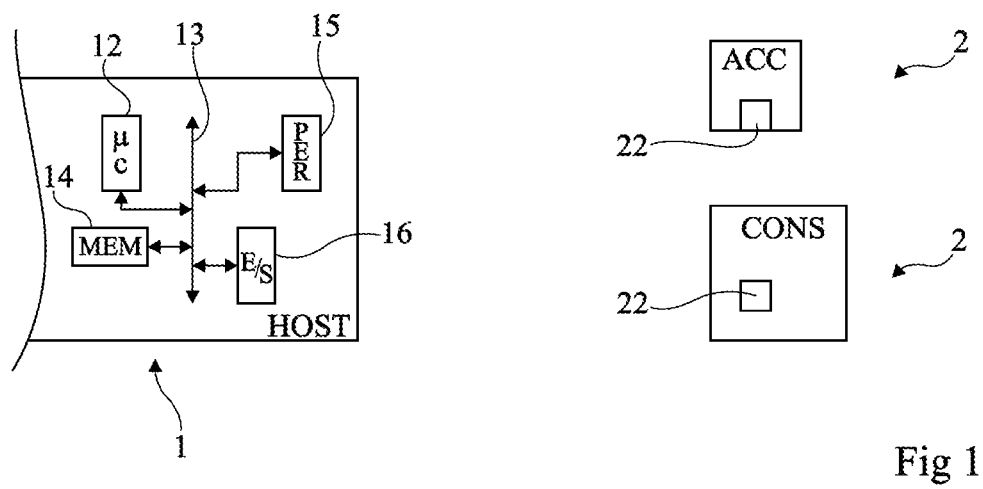
FIG. 1 is a very simplified representation in the form of blocks of an example of a system of the type to which the embodiments which will be described apply as an example.

In the ensuing description, numerous specific details are provided in order to facilitate as much as possible understanding of the embodiments provided by way of example. The embodiments may be implemented with or without specific details, or else with other methods, components, materials, etc. In other cases, structures, materials, or operations that are well known are not shown or described in detail so that aspects of the embodiments will not be obscured. Reference in the framework of the present description to "an embodiment" or "one embodiment" means that a given peculiarity, structure, or characteristic described in connection with the embodiment is comprised in at least one embodiment. Hence, recurrence of phrases such as "in an embodiment" or "in one embodiment" in various points of the present description does not necessarily refer to one and the same embodiment. Moreover, the peculiarities, structures, or characteristics may be combined in any convenient way in one or more embodiments.

The notations and references are here provided only for convenience of the reader and do not define the scope or the meaning of the embodiments.

The same elements have been designated with the same reference numerals in the different drawings unless the context indicates otherwise.

For clarity, only those steps and elements which are useful to the understanding of the embodiments which will be described have been shown and will be detailed. In particular, the generation of the signals exchanged between the circuits and their interpretation on the terminal side and on the transponder side have not been detailed, the described embodiments being compatible with usual techniques of generation and interpretation of the signals. In the following description, when reference is made to terms approximately, about, and in the order of, this means to within 10%, for example to within 5%.

FIG. 1 very schematically shows, in the form of blocks, an example of a system of the type to which the embodiments which will be described apply. A host device 1 (HOST) is capable of receiving or of operating with one or a plurality of products 2, accessories (ACC), or consumables (CONS). As a specific example of application, the host device is a printer and the product (consumable) is an ink cartridge. According to another example, it is an electronic system (for example, a game console, a cell phone, etc.) using accessories (for example, game pads, earphones, a hull, a case, etc.). More generally, it may be any type of system based on the cooperation between a main device (host) and one or a plurality of accessories or consumables (products).

Manufacturers of consumables or accessories are generally looking for a protection against the use of counterfeit or non-authentic accessories in order, among other things, to guarantee the quality and the reliability of the original products with respect to copies or "clones" for their users. It may, for example, be desired to avoid possible counterfeits. Reference will be made hereafter to copies to designate non-authentic products, be they slavish imitations or more generally similar products capable of being used as authentic products.

The protection generally comprises a mechanism of authentication of a new product introduced into the host device, or even an authentication each time the device is powered on, or leaves the stand-by mode, or each time the product is used (for example, for each printing). In the example of a printer, the printer and all cartridges are equipped with an electronic circuit adapted to such an authentication, for example, a cryptographic processor or a program executed by a processor.

For example, as illustrated in FIG. 1, host device 1 comprises a circuit 12 of microcontroller type (μC) capable of communicating over one or a plurality of address, control, and data buses 13 with one or a plurality of memories 14 (MEM), one or a plurality of peripherals 15 (PER), for example, the various circuits of device 1, and one or a plurality of input-output circuits 16 (E/S), among which a device capable of communicating with products 2.

A product 2, be it a consumable or an accessory, comprises at least one circuit 22, which may be protected, for example, of microcontroller type, comprising the same type of components (not shown): a processor, volatile and non-volatile memories, an input-output interface towards a bus of communication with device 1, etc.

In usual techniques, device 1 and products 2 share authentication keys stored in the memory, having the authentication procedures based thereon.

In the embodiments described hereafter, the authentication is not performed by exchange of authentication keys stored in the form of digital words, but based on electric parameters intrinsic to the electronic circuit of the cartridge.

An embodiment uses a discharge speed of a charge storage element on the side of product 2. An embodiment controls an electric power supply of the electronic circuits 22 associated with products 2 to determine the authenticity thereof.

Figure 2:
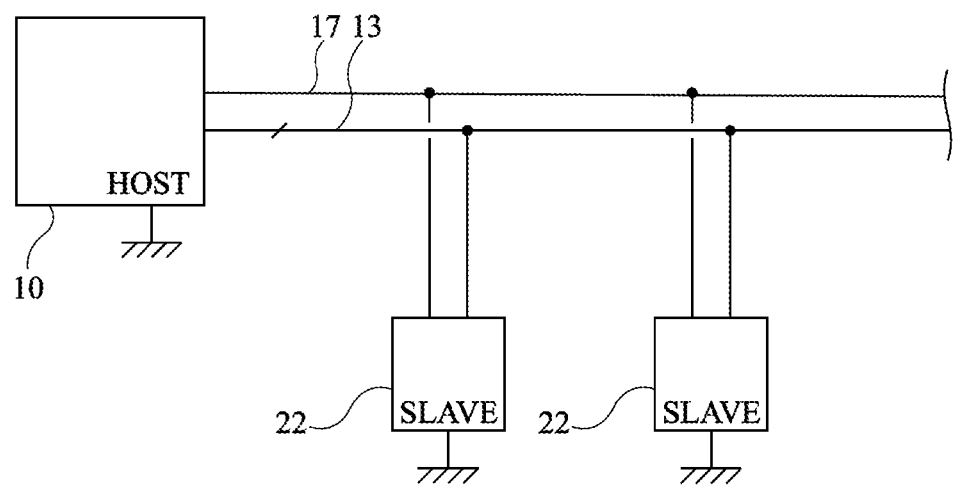
FIG. 2 illustrates, in a block diagram, an embodiment of the authentication method.

FIG. 2 illustrates, in a block diagram, an embodiment of the authentication method.

The electronic circuit of product 1, here symbolized by a block 10 (HOST), controls products 2, more specifically electronic circuits 22 of the products forming slave circuits (SLAVE), not only via a communication bus 13, but also by controlling their powering, that is, by controlling the power supply, for example, by providing a power supply bus 17.

Each slave circuit 22 comprises a circuit 3 capable of retaining electric charges in controllable fashion for a time measurement. Examples of circuits of this type are described in U.S. Pat. Nos. 8,963,574; 8,872,177; 8,331,203; 8,320,176; 8,036,020; and 8,339,848.

Figure 3:
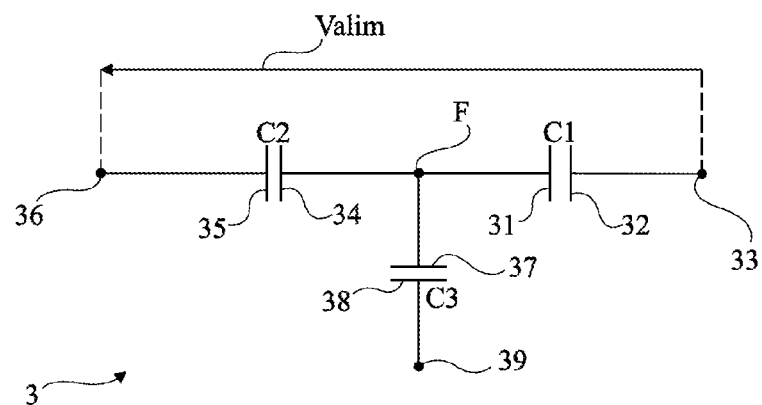
FIG. 3 is a simplified electric diagram of an example of an embodiment of a circuit capable of controllably retaining electric charges for a time measurement.

FIG. 3 is a simplified electric diagram of an example of a circuit 3 capable of controllably retaining electric charges for a time measurement.

Circuit 3 comprises a first capacitive element C1 having a first electrode 31 connected to a floating node F and having a second electrode 32 connected to a terminal 33 of application of a voltage, and a second capacitive element C2 having a first electrode 34 connected to node F and having a second electrode 35 connected to a terminal 36 of application of a voltage. Circuit 3 further comprises a third capacitive element C3 having a first electrode 37 connected to node F and having a second electrode 38 connected to a terminal 39 of application of a voltage, and having its dielectric space designed, due to its permittivity and/or to its thickness, to have a non-negligible leakage along time. Capacitive element C1 has a charge retention capacity greater than that of element C3, and capacitive element C2 has a charge retention capacity greater than that of element C3, but smaller than that of element C1. A function of capacitive element C1 (storage element) is to store electric charges. A function of capacitive element C3 (flow element) is to discharge storage element C1 relatively slowly as compared with a direct ground connection of its electrode 31. A function of capacitive element C2 is to allow a charge injection into capacitive element C1, while avoiding the stress which would result, for flow element C3, from a direct charge of storage element C1 by application of a power supply voltage between node F and terminal 33.

In a charge retention phase initialization step, terminals 33 and 39 are at a reference voltage, for example, the ground, and a high power supply voltage (positive with respect to ground) Valim is applied to terminal 36, which causes the charge of capacitive element C1. As a variation, to charge element C1, terminal 39 may be grounded, and terminals 36 and 33 may be set to voltages which are respectively positive and negative with respect to ground. When the power supply voltage is no longer applied between terminals 36 and 33, for example, when the circuit is no longer powered, storage element C1 discharges in controlled fashion (relatively slowly) through flow element C3. It should be noted that a controlled discharge phase may also be provided when the circuit is still being powered. During the discharge phase, terminals 33, 36, and 39 may be left floating, or even set to a same reference voltage, for example, the ground. In a read phase, after a discharge phase, the residual charge of storage element C1 is measured (the device may be powered to take the measurement). The residual charge of element C1 is considered as representative of the time elapsed between the end of the initialization step and the read step.

An embodiment exploits such electric charge retention circuits to determine the authenticity of products 2.

In an embodiment, each time an authentication is needed (for example, each time a new cartridge is introduced into a printer, each time the printer is powered on, each time the stand-by mode is left, for each printing, etc.), circuit 10 (FIG. 2) determines whether charge retention circuit 3 of circuit 22 behaves in expected fashion, that is, whether its discharge time corresponds to an expected duration.

Circuit 10 thus contains, in its memory 14, information relative to the behavior of circuits 3 of authentic products 2. For example, circuits 22 are submitted to a test or characterization phase at the end of the manufacturing enabling to determine the discharge profile of their circuits 3. According to another example, circuits 3 are formed in a sufficiently reproducible way so that their time behavior can be characterized.

Figure 4:
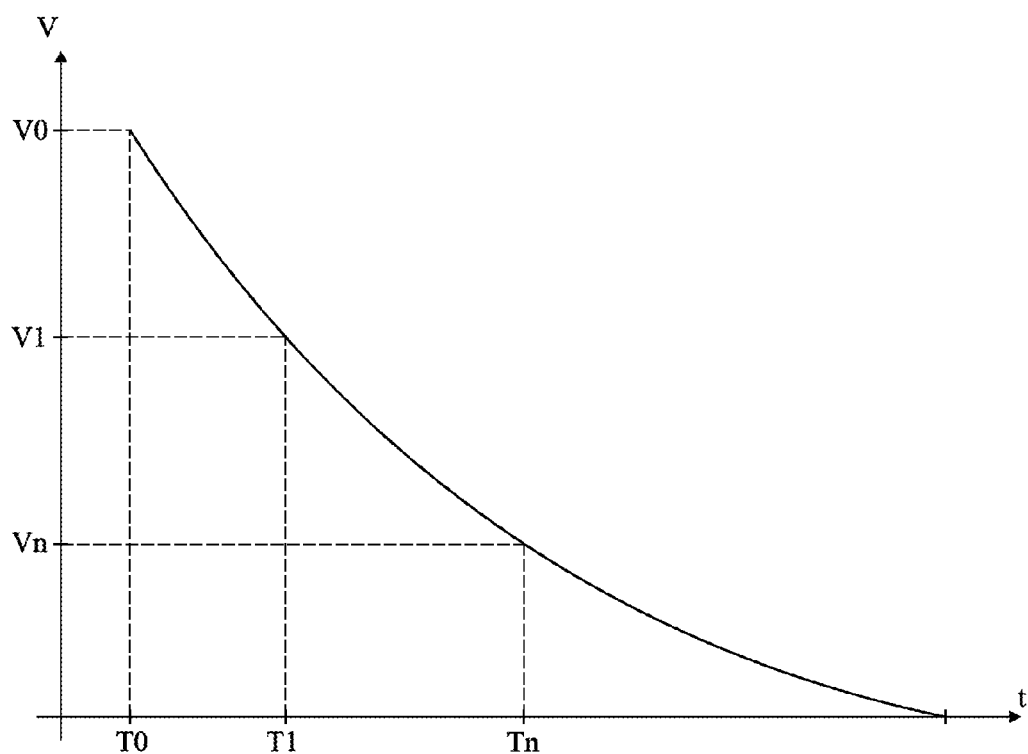
FIG. 4 is a graph illustrating the behavior of a charge retention circuit of an embodiment by application of an embodiment of an authentication method.

FIG. 4 is a graph illustrating the behavior of a charge retention circuit 3 of a circuit 22 by application of an embodiment of an authentication method.

It is assumed that circuit 10 causes the power supply of circuit 22 and that, in a step of initialization of the measurement, it causes the charge of circuit 3 up to a level representing a voltage V0 at node F of charge retention circuit 3.

Then, at a time T0, circuit 10 switches off the power supply of circuit 22 for a time that it selects. This duration may be a fixed duration or a random duration.

At the end of this duration (time T1 in FIG. 4), circuit 10 switches circuit 22 back on and asks for the charge value or residual voltage measurement. This measurement provides a level representing a voltage V1.

Circuit 22 then communicates measured value V1 to circuit 10, which compares this value with an expected value. This expected value is for example obtained from a table stored in the memory of circuit 10. In the case of a power supply cutoff of random duration, circuit 10 measures this duration to extract, from the characteristic of FIG. 4 stored in the memory of circuit 10, the value of the voltage which should be provided by circuit 22.

According to the duration (for example, T1 or Tn) for which the power supply of circuit 22 is switched off, the voltage measurement (for example, V1 or Vu) differs. It is thus possible for circuit 10 to know after how much time a voltage level (decreasing over time) should be reached or which voltage value is obtained at the end of a given duration.

For the interpretation of the measurements, circuit 22 communicates either voltage value V, or the corresponding time T, or estimates itself a duration, as will be seen hereafter.

The response of charge retention circuit 3 is specific to the integrated circuit chip forming circuit 3, included in circuit 22. Accordingly, this response differs from one chip to the other (actually from one chip category to another). A non-authentic cartridge having its circuit 22 formed in a different technology will thus not provide the same response and will not be authenticated.

According to the variability of the responses of circuits 3, for example, due to manufacturing tolerances, approximate measurement thresholds taking such tolerances into account may be provided. As a variation, the characteristics of the responses of the different circuits may be communicated to the host devices with an identifier (code) of the products series.

Figure 5:
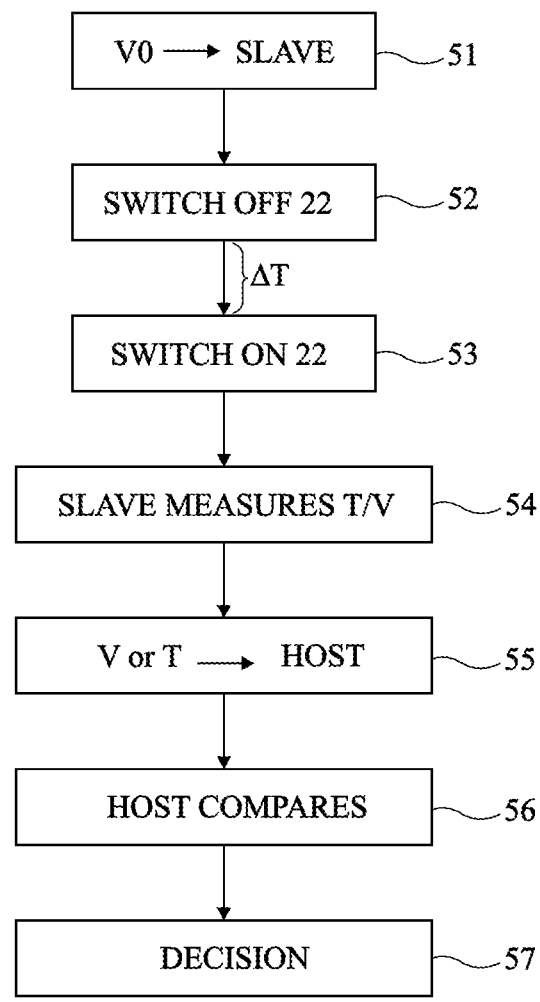
FIG. 5 is a block diagram of an embodiment of an authentication method.

FIG. 5 is a block diagram of an embodiment of the authentication method.

Master or host circuit 10 starts by communicating voltage V0 to slave circuit 22 (block 51, V0→SLAVE). As a variation, voltage V0 is measured by the slave circuit itself on reception of a control signal originating from the master circuit. Then, circuit 10 switches off the power supply of slave circuit 22 (block 52, SWITCH OFF 22). This interruption of the power supply lasts for a determined or random time interval ΔT. At the end of time interval ΔT, circuit 10 switches circuit 22 back on (block 23, SWITCH ON 22). As soon as it is switched back on, circuit 22 estimates (block 54, SLAVE MEASURES T/V) the corresponding time T or voltage V value, and then communicates this value to circuit 10 (block 55, V or T→HOST). Circuit 10 compares (block 56, HOST COMPARES) the value transmitted by circuit 22 with an expected value, which is a function of time interval ΔT.

The conversion between the voltage values and the time values is, for example, performed using a conversion table stored on the master and/or slave side.

The authenticity is validated (block 57, DECISION) if this comparison results in an identity of the values (or an approximate identity according to the expected measurement tolerances and technological dispersions).

Figure 6:
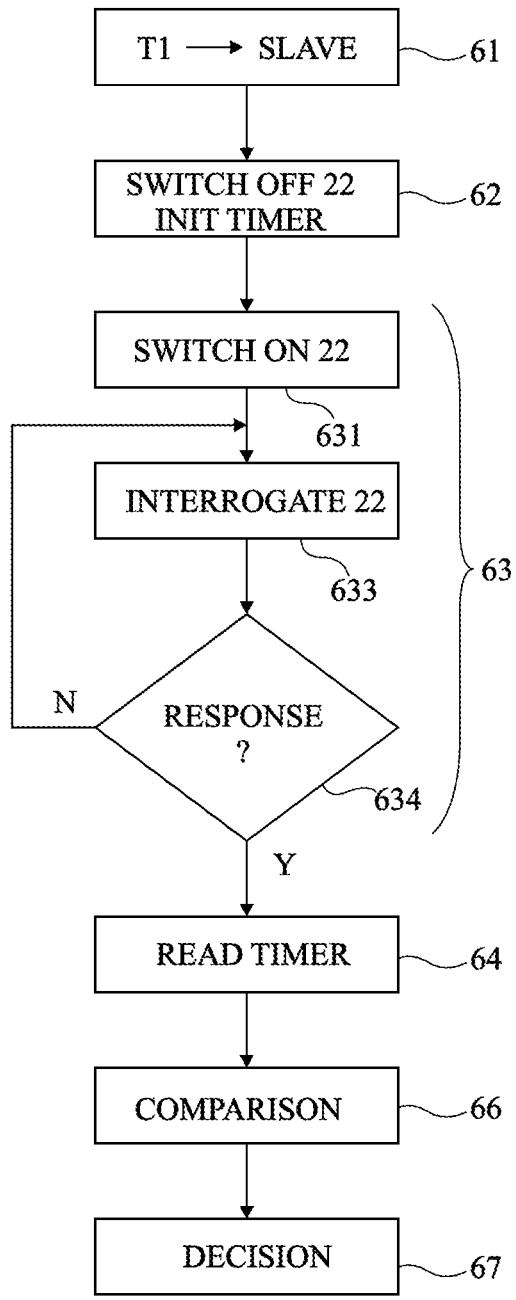
FIG. 6 is a block diagram of another embodiment of an authentication method.

FIG. 6 is a block diagram of another embodiment of an authentication method.

Master or host circuit 10 starts by communicating an indication of a duration T1 to slave circuit 22 (block 51, T1→SLAVE). This duration is stored by circuit 22 and represents a duration for which it refrains from responding to any interrogation from circuit 10. Then, circuit 10 switches off the power supply of circuit 22 and initializes a time counter that it contains (block 52, SWITCH OFF 22, INIT TIMER). Circuit 10 then periodically interrogates (63) circuit 22. For example, it switches circuit 22 back on (block 631, SWITCH ON 22) and sends a request (block 633, INTERROGATE 22). As long as circuit 22 does not respond (output N of block 634, RESPONSE?), circuit 10 continues measuring the time which elapses (loops back onto block 633). As soon as circuit 22 responds (output Y of block 634), this means that the charge retention circuit of circuit 22 has reached a charge level representing duration T1. Circuit 10 then reads the value of its time counter (block 64, READ TIMER), then compares this value with the value that it has initially communicated (block 61) to circuit 22 to take an authenticity decision (block 67, DECISION).

In the embodiment of FIG. 6, circuit 22 does not need to communicate data to circuit 10, which is particularly adapted to simple circuits 22. It then just has to respond with an acknowledgement to an interrogation request to allow an authentication decision.

According to an alternative embodiment, duration T1 is not communicated by the master circuit to the slave circuit, but this value or information representative of this value (encrypted value or cryptogram) is transmitted to the master circuit and to the slave circuit by a third-party circuit, possibly distant, for example generated by a data server with which circuits 10 and 22 are in remote communication.

Exchanges between the host device and the product(s) may be protected in usual fashion, for example, with a symmetrical or asymmetrical encryption based on keys contained in product 2 and in device 1.

Various embodiments have been described. Various alterations, modifications, and improvements will readily occur to those skilled in the art. In particular, the selection of the value of the authentication thresholds depends on the breakdown voltage of the transponder components and may vary from one application to another. Further, the practical implementation of the described embodiments is within the abilities of those skilled in the art based on the functional indications given hereabove and by using electronic components usual per se.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
   initializing, by a host device, a charge retention circuit of a slave device, wherein initializing the charge retention circuit comprises switching off a power supply of the slave device;
   receiving, by the host device, an indication of a discharge time of the charge retention circuit;
   determining, by the host device, an authenticity of the slave device based on the received indication of the discharge time of the charge retention circuit; and
   controlling, by the host device, communication with the slave device based on the determined authenticity of the slave device, wherein the method includes:
   transmitting, by the host device to the slave device, a voltage representative of a charge level to be stored in the charge retention circuit;
   charging, by the slave device, of the charge retention circuit;
   switching off, by the host device, of the power supply of the slave device for a duration of time;
   measuring, by the slave device, a residual quantity of charge in the charge retention circuit at an expiration of the duration of time;
   transmitting, by the slave device to the host device, information representative of the residual quantity; and
   comparing, by the host device, said information with an expected value of said information.

2. The method of claim 1 wherein the host device compares information representative of time, generated by the charge retention circuit, with information indicative of an expected duration.

3. The method of claim 1 wherein a duration of time in which the power supply of the slave device is switched off is random.

4. The method of claim 1, comprising:
   receiving, by the slave device, a value indicating to the slave device a no-response time-period;
   initializing of a time counter and switching off, by the host device, of the power supply of the slave device;
   switching on the power supply and periodically interrogating, by the host device, of the slave device until the slave device responds to an interrogation;
   determining, by the host device, an elapsed duration based on when the slave device responded to the interrogation; and
   comparing the determined elapsed duration with an expected duration.

5. The method of claim 4, comprising transmitting, by the host device to the slave device, said value indicating the no-response time period.

6. The method of claim 4, comprising transmitting, by a third device to the host device and the slave device, said value indicating the no-response time period.

7. A device, comprising:
   one or more memories;
   a slave-device interface; and
   circuitry, coupled to the slave-device interface, wherein the circuitry, in operation:
   initializes charge-retention circuits via the slave-device interface, wherein initializing a charge retention circuit of a slave device comprises switching off a power supply of the slave device associated with the charge-retention circuit for a duration of time;
   authenticates slave devices based on indications of discharge times of charge-retention circuits received via the slave-device interface; and
   controls communication with slave devices based on the authenticating of slave devices, wherein the circuitry, in operation:
   transmits, via the slave-device interface, a voltage representative of a charge level to be stored in the charge-retention circuit; and
   responds to receipt of an indication of a residual quantity of charges associated with the charge-retention circuit at an expiration of the duration of time by comparing said indication with an expected value.

8. The device of claim 7 wherein the circuitry, in operation, compares an indication of a discharge time with information indicative of an expected duration.

9. The device of claim 7 wherein the duration of time in which the power supply associated with the charge-retention circuit is switched off is random.

10. The device of claim 7 wherein the circuitry, in operation:
    initializes a time counter and switches off the power supply associated with a charge-retention circuit;
    switches on the power supply and periodically interrogates the slave device until the slave device responds to an interrogation;

determines an elapsed duration based on when the slave device responds to the interrogation; and compares the determined elapsed duration with an expected duration.

11. The device of claim 10 wherein the circuitry, in operation, transmits via the slave-device interface, a value indicating a no-response time period.

12. The device of claim 10 wherein the circuitry, in operation, receives the value indicating the no-response period from a third device.

13. A device, comprising:

a charge-retention circuit;

an interface to couple to a host device;

circuitry, which, in operation, responds to an initialization signal, by:

initializing the charge-retention circuit, wherein the initializing signal switches off of a power supply associated with the charge-retention circuit;

generating an indication of a discharge time of the charge-retention circuit; and controlling communication with the host device based on the determined indication, wherein the initialization signal comprises a voltage representative of a charge level to be stored in the charge-retention circuit, and the circuitry, in operation:

charges the charge retention circuit;

measures a residual quantity of charges in the charge-retention circuit at an expiration of a duration of time; and transmits, to the host device via the interface, information representative of the residual quantity to be compared with an expected value.

14. The device of claim 13 wherein the controlling communication with the host device comprises transmitting the indication to the host device via the interface.

15. The device of claim 13 wherein the initialization signal comprises a value indicative of a no-response time-period, and the circuitry, in operation, responds to the initialization signal by:

charging the charge-retention circuit;

ignoring interrogations received via the interface until a charge-level of the charge-retention circuit corresponds to an expiration of the no-response time-period.

16. A system, comprising:

a host device having control circuitry; and a slave device having a charge-retention circuit, wherein the control circuitry of the host device, in operation:

controls one or more signals to cause the slave device to initialize the charge-retention circuit, wherein initializing the charge retention circuit comprises switching off a power supply of the slave device;

receives an indication of a discharge time of the charge-retention circuit;

determines an authenticity of the slave device based on the received indication of the discharge time of the charge-retention circuit; and controls communications with the slave device based on the determined authenticity of the slave device, wherein the control circuitry of the host device, in operation:

transmits to the slave device, a voltage representative of a charge level to be stored in the charge-retention circuit;

switches off the power supply associated with the charge-retention circuit for a duration of time; and responds to receipt of an indication of a residual quantity of charges associated with the charge-retention circuit at an expiration of the duration of time by comparing said indication with an expected value.

17. The system of claim 16 wherein the host device is a printer and the slave device is a printer cartridge.

18. The system of claim 16 wherein the control circuitry, in operation, compares the indication of the discharge time with information indicative of an expected duration.

19. The system of claim 16 wherein the control circuitry, in operation:

initializes a time counter and switches off the power supply associated with the charge-retention circuit;

switches on the power supply and periodically interrogates the slave device until the slave device responds to an interrogation;

determines an elapsed duration based on when the slave device responds to the interrogation; and compares the determined elapsed duration with an expected duration.

* * * * *